UNITED STATES PATENT OFFICE.

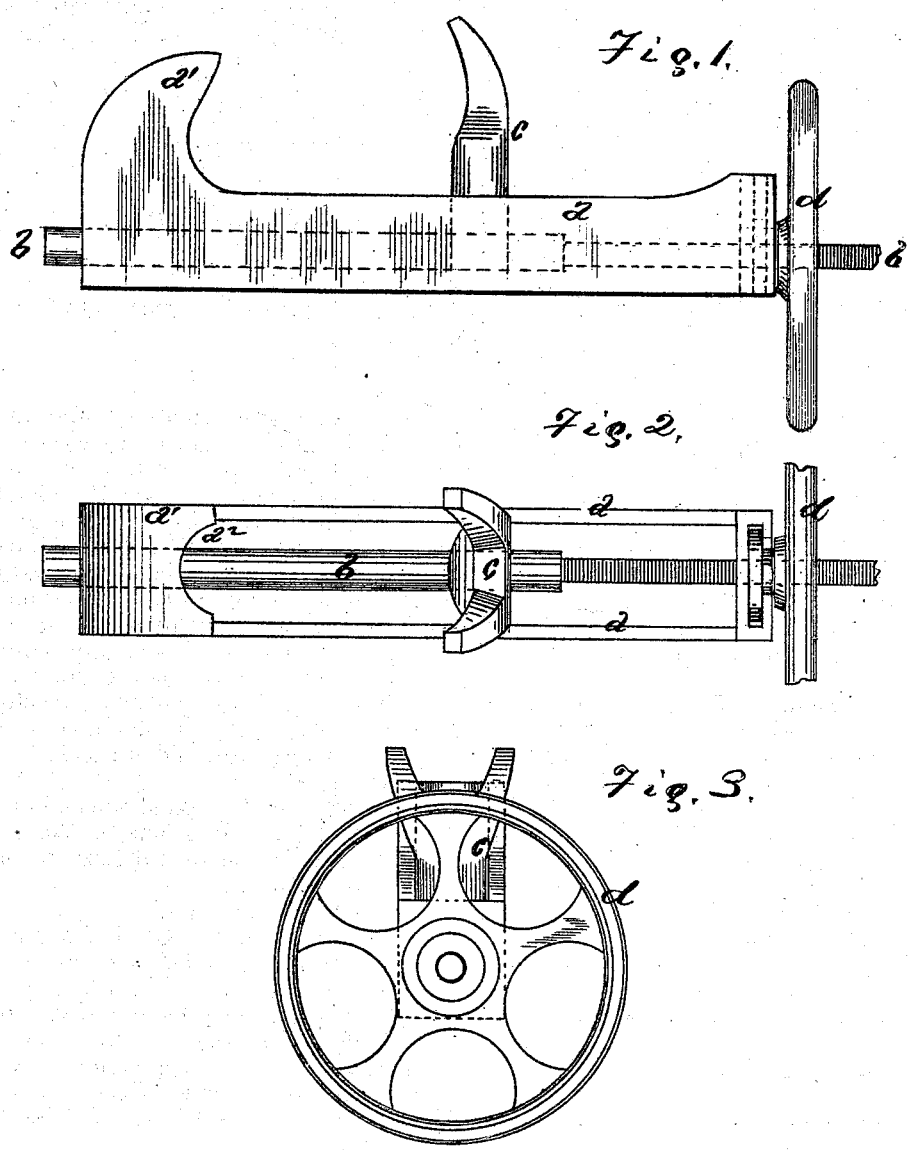

MARTIN TAYLOR, OF HARTFORD, CONNECTICUT.

IMPROVEMENT IN CLAMPS FOR THILL-COUPLINGS.

Specification forming part of Letters Patent No. 141,901, dated August 19, 1873; application filed May 29, 1873.

*To all whom it may concern:*

Be it known that I, MARTIN TAYLOR, of Hartford, in the county of Hartford and State of Connecticut, have invented an Improved Clamp for Setting the Rubbers of Carriage-Thill Shackles, of which the following is a specification, reference being had to the accompanying drawings, in which—

Figure 1 is a side view of the clamp. Fig. 2 is a top view of the same. Fig. 3 is an end view.

In all well-built modern carriages a piece of India rubber is inserted in the thill-shackle for the purpose of preventing the thill-straps from rattling. At present, it is a matter of great difficulty to insert this rubber in place, as it has to be compressed between the end of the thill-strap and the shackle, and the situation does not offer any advantage for doing this.

The letter $a$ indicates the body of the clamp, preferably of cast-iron—a box without top or bottom, so to speak. At one end rises the shoulder $a^1$, curving forward or inward as it rises, and having the cut-away $a^2$, so that this shoulder is exactly adapted to fit upon and against the back side of the clip or shackle. Through the open center of the box $a$ runs the rod $b$, sliding in corresponding holes made in the ends of the box $a$, and carrying the claw $c$, the two prongs of which are just adapted in shape to fit against the small cylinder on the end of the thill-strap, and to straddle the strap. Upon one end of the rod $b$ is a screw-thread running through the hand-wheel $d$, which has a collar, $e$, in its side, fitting into the groove or dovetailed slot $f$ made in the end of the box $a$, so that, while this hand-wheel is free to turn, it cannot, while on the rod $b$, escape from the slot. By the turning of this wheel the claw $c$ is moved back and forth, and any required degree of pressure exerted on the rubber.

As indicated already, the back of the clip or shackle is grasped by the shoulder $a^1$, and the small cylinder on the end of the thill-strap by the claw $c$.

The rubber is placed behind the end of the thill-strap, and then, by means of the hand-wheel, the rubber is squeezed into its place with the utmost ease.

I claim as my invention—

The combination of the box $a$, having the shoulder $a^1$ fitted to take hold of the back of a thill-shackle, the rod $b$, provided with the claw $c$, fitted to embrace the end of the thill-strap, and the hand-wheel $d$, the whole constructed, arranged, and designed for operation and use substantially as described.

MARTIN TAYLOR.

Witnesses:
    WM. EDGAR SIMONDS,
    S. J. SIMONDS.